(12) United States Patent
Stockbower (10) Patent No.: US 7,101,479 B2
(45) Date of Patent: Sep. 5, 2006

(54) FILTER CARTRIDGE CONSTRUCTION

(75) Inventor: David Stockbower, Woburn, MA (US)

(73) Assignee: Entegris, Inc., Chaska, MN (US)

( * ) Notice: Subject to any disclaimer, the term of this patent is extended or adjusted under 35 U.S.C. 154(b) by 0 days.

(21) Appl. No.: 10/509,499

(22) PCT Filed: Mar. 6, 2003

(86) PCT No.: PCT/US03/06927

§ 371 (c)(1),
(2), (4) Date: Sep. 28, 2004

(87) PCT Pub. No.: WO03/082435

PCT Pub. Date: Oct. 9, 2003

(65) Prior Publication Data

US 2005/0178713 A1    Aug. 18, 2005

(51) Int. Cl.
*B01D 35/30* (2006.01)
(52) U.S. Cl. ............... 210/232; 210/444; 210/452; 210/454; 210/455
(58) Field of Classification Search ............ 210/232, 210/435, 440, 443, 444, 451, 452, 454, 455, 210/497.01, 493.1, 493.2, 484, 485
See application file for complete search history.

(56) References Cited

U.S. PATENT DOCUMENTS

| 3,118,836 A | 1/1964 | Briggs |
| 3,399,776 A | 9/1968 | Knuth |
| 3,460,680 A | 8/1969 | Domnick |
| 3,696,933 A | 10/1972 | Pall et al. |
| 4,028,254 A | 6/1977 | Shufflebarger et al. |
| 4,172,798 A | 10/1979 | Kronsbein |
| 4,316,801 A | 2/1982 | Cooper |
| 4,645,601 A | 2/1987 | Regunathan et al. |
| 4,678,576 A | 7/1987 | Leoncavallo |
| 4,719,012 A | 1/1988 | Groezinger et al. |
| 4,735,716 A | 4/1988 | Petrucci et al. |
| 4,876,005 A | 10/1989 | America |
| 4,948,505 A | 8/1990 | Petrucci et al. |
| 5,035,797 A | 7/1991 | Janik |
| 5,089,131 A | 2/1992 | Gentry |
| 5,114,572 A | 5/1992 | Hunter et al. |
| 5,133,858 A | 7/1992 | Walz et al. |
| 5,354,464 A | 10/1994 | Slovak |
| 5,548,893 A | 8/1996 | Koelfgen |
| 5,549,821 A | 8/1996 | Bounnakhom et al. |
| 5,556,542 A | 9/1996 | Berman et al. |

(Continued)

FOREIGN PATENT DOCUMENTS

EP            364299            4/1990

(Continued)

*Primary Examiner*—Matthew O. Savage
(74) *Attorney, Agent, or Firm*—Timothy J. King; Paul J. Cook; John E. Pillion (57) ABSTRACT

A filtration module (10) is provided which includes a manifold (12), a filter cartridge (16) and a bowl (14) which houses the filter cartridge (16). The filter cartridge (16) and bowl (14) are connected to each other by a key (30) which is secured to flat surfaces (38) on the cartridge (16) to form a unitary construction. The filter cartridge (16) and bowl (14) are in fluid communication with the manifold (12) in a manner which prevents mixing of a fluid feed to the module (10) and a permeate removed from the module (10).

9 Claims, 11 Drawing Sheets

U.S. PATENT DOCUMENTS

| | | |
|---|---|---|
| 5,591,329 A | 1/1997 | Davidson |
| 5,595,651 A | 1/1997 | Pavel |
| 5,609,757 A | 3/1997 | Schiavo et al. |
| 5,679,251 A | 10/1997 | Swanson et al. |
| 5,753,107 A | 5/1998 | Magnusson et al. |
| 5,837,137 A | 11/1998 | Janik |
| 6,006,924 A | 12/1999 | Sandford |
| 6,533,933 B1 | 3/2003 | Stankowski |
| 6,635,175 B1 | 10/2003 | Stankowski |
| 6,921,479 B1 * | 7/2005 | Ardes .................. 210/232 |
| 2002/0014452 A1 | 2/2002 | Janik |
| 2002/0046969 A1 | 4/2002 | Bartsch et al. |

FOREIGN PATENT DOCUMENTS

| | | |
|---|---|---|
| EP | 0 657 201 A1 | 6/1995 |
| SU | 583810 | 1/1978 |
| SU | 605626 | 5/1978 |
| SU | 755291 | 8/1980 |
| SU | 528108 | 10/1996 |
| WO | WO 00/21640 | 4/2000 |
| WO | WO 01/26777 | 4/2001 |
| WO | WO 03/002228 | 1/2003 |
| WO | WO 03/002229 | 1/2003 |
| WO | WO 03/082434 | 10/2003 |

* cited by examiner

FILTER CARTRIDGE CONSTRUCTION

BACKGROUND OF THE INVENTION

The present invention relates to membrane filtration modules and a filtration cartridge that are more sanitary and are easier to replace and install than presently available filtration modules. More particularly, the present invention relates to a filtration cartridge and membrane filtration modules formed from a filtration cartridge, a reusable bowl, a reusable manifold and a reusable connecting device to connect the filtration cartridge, retaining bowl and manifold together.

The control of particulate contaminants in a filtration process such as in the semiconductor industry requires the use of ultraclean filters having membranes that remove submicron particles. It is well known that any particle that is deposited on a semiconductor wafer produces a defect when the particle is sufficiently large. Typically, in the semiconductor industry, failed defects can be produced by particles as small as about one tenth of the smallest features of the semiconductor chip. Therefore, membrane filters are used in every process step for producing semiconductor chips to purify both working liquids and gases.

Although many different designs have been developed for a filtration module used in an ultrapure liquid filtration, two designs are prevalent. In one module design, liquid to be filtered flows from one end of the filtration module to the other end. In this class of filtration modules, the feed and permeate connections are located at opposite ends of the filter thereby forcing the liquid flow to move from one end to the other. This flow configuration is referred to as an in line flow configuration. These filtration modules suffer from two disadvantages. First, they are more difficult to connect to the process equipment since the module is sandwiched between two sets of connections. Second, any free liquid remaining within the module quickly drains upon disconnection of the module because at least one connection is positioned at the bottom of the module.

A second filtration modular design locates all of the connections at the same end of the module. In this type of module, the feed and permeate ports are typically horizontally oriented at the top of "head" end of the module on opposite sides thereof. Due to their shape, these modules are referred to as having a T configuration. The T configuration facilitates connection of the head to the remaining portion of the filtration module comprising the bowl and the filtration cartridge positioned within the bowl. In this design, the bowl and filtration cartridge comprise separate elements. Thus, when constructing the filtration module, the filtration cartridge and the bowl are separately secured to and sealed to the manifold head. In addition, upon completion of filtration, the bowl and cartridge are separately removed from the head. This separate removal requires that the bowl be moved a distance substantially greater than the entire length of the cartridge thereby exposing the cartridge to permit its removal. Thereafter, the exposed cartridge is removed by hand or with a hand tool. Since the filter cartridge is saturated with the liquid being filtered which is often times corrosive or toxic, the cartridge removal step presents a danger to the worker. In addition, since the bowl must be moved the length of the cartridge, the space within which the bowl and cartridge are positioned must accommodate this removal step.

It has been proposed in U.S. Pat. No. 5,114,572, to provide a filter assembly which cooperates with a bowl to produce a filter cartridge-bowl construction which can be demounted as a single unit from a manifold. The filter cartridge is connected to the bowl by bayonet connections on the cartridge which fit into grooves within the interior surface of the bowl. The bayonet connections are formed integrally with the cartridge such as by being molded as a single unit. When the cartridge is so-configured, it can only be used with a bowl configured to accept the bayonet. This is undesirable since it prevents the so-configured cartridge to be used with presently produced bowls configured to not accept this cartridge. This, in turn, severely reduces the market for the so-configured cartridge. In addition, the bayonet connections are positioned below the top surface of the cartridge so that they fit into grooves in the bowl also positioned below the top surface of the cartridge. When the bayonets are so-positioned, positioning in the grooves is made more difficult by the reduced visibility.

Accordingly, it would be desirable to provide a filtration cartridge which permits its use in a plurality of bowls of different configurations. In addition, it would be desirable to provide such a cartridge which includes a connection means between the cartridge and a bowl with means that are not movable relative to the cartridge during filtration. In addition, it would be desirable to provide such a cartridge having a connection means which are clearly visible so that connection of the cartridge to the bowl is facilitated. Such a cartridge would promote ease of inserting the filter cartridge into the bowl, would eliminate the danger to the worker in removing the filter cartridge subsequent to filtration and would reduce the space required to install the filtration module.

SUMMARY OF THE INVENTION

In accordance with this invention, a filtration module is provided comprising a manifold, and the combination of a filter cartridge and bowl wherein the filter cartridge and bowl are locked together to be installed and removed as one piece from the manifold. The filter cartridge includes a fluid passageway for fluid communication between the manifold and the interior of the cartridge. The outside surface of the fluid passageway includes two flat parallel surfaces which mate with two flat surfaces of a key so that the key can be slideably mounted on the fluid passageway. In a first embodiment, the key is provided with bayonets which fit into slots in the bowl thereby to effect connections of the cartridge to the bowl. In a second embodiment, the key is provided with hook-shaped elements which are snap fit over the open lip of the bowl thereby to effect connection of the cartridge to the bowl. The key is removable form the filter cartridge so that the cartridge can be utilized with a conventional bowl not secured to the filter cartridge or with the bowl utilized in the filter module of this invention. The key and bayonets or the key and hook-shaped elements which secure the cartridge to the bowl permit the cartridge and bowl to be removed as one piece from the manifold.

DESCRIPTION OF SPECIFIC EMBODIMENTS

The present invention provides a filter cartridge and a filtration module formed of a manifold, the filtration cartridge and a bowl. The manifold provides fluid pathways for fluid feed into the filtration cartridge and permeate removal from the filtration cartridge. The bowl provides a means of storing fluid feed to permit its introduction into the filtration cartridge or to store permeate from the filtration cartridge to be directed to the manifold and then from the filtration module. Fluid feed can be introduced into the filtration cartridge through the manifold either from the outside of the filter cartridge or from within the interior of the filtration cartridge. The fluid in the bowl adjacent the filtration cartridge can be either fluid feed or permeate. In any event, the fluid feed is introduced from a manifold into the filtration cartridge, permeate is removed from the filtration cartridge from the manifold and sealing is provided to prevent admixture of fluid feed and permeate.

The filtration cartridge and bowl are constructed so that they are sealed with the manifold or removed from contact with the manifold as one piece. The filter cartridge is sealed with two end caps, one of which is provided with a fluid passageway. The fluid passageway has two opposing substantially parallel flat surfaces positioned on its outside surface. The cartridge is provided with a key that is slideably mounted on the two flat surfaces thereby to be positioned around the fluid passageway of the cartridge. The fluid passageway can function as an inlet or outlet of the cartridge. The key is configured to effect locking of the cartridge to the bowl. In one embodiment, the bowl and filter cartridge are joined together by bayonets on the key which fit into slots on the interior surface of the bowl. In a second embodiment, the key is joined to the bowl by being snap fit onto the open top lip of the bowl. The flat surfaces on the fluid passageway prevent the key from rotating relative to the cartridge. Subsequent to a filtration, the bowl and filter cartridge are removed from the manifold as a single piece rather than as two separate pieces. Since the bowl and filter cartridge are removed together, the filter cartridge need not be removed from the bowl. Thus, a space substantially equal to the length of the filtration cartridge and the bowl together need not be provided to remove the filter cartridge. Only a space as long as substantially the length of the bowl need not be provided. This permits one to install a filtration cartridge of this invention within a smaller space as compared to the space required with present filtration modules. In addition, since the filtration cartridge is removed with the bowl, it need not be handled by a worker either by hand or with a hand tool. This substantially reduces the possibility of contacting fluid within the bowl with a worker. The bowl optionally can contain a drain for removing fluid before removal.

Figure 1:
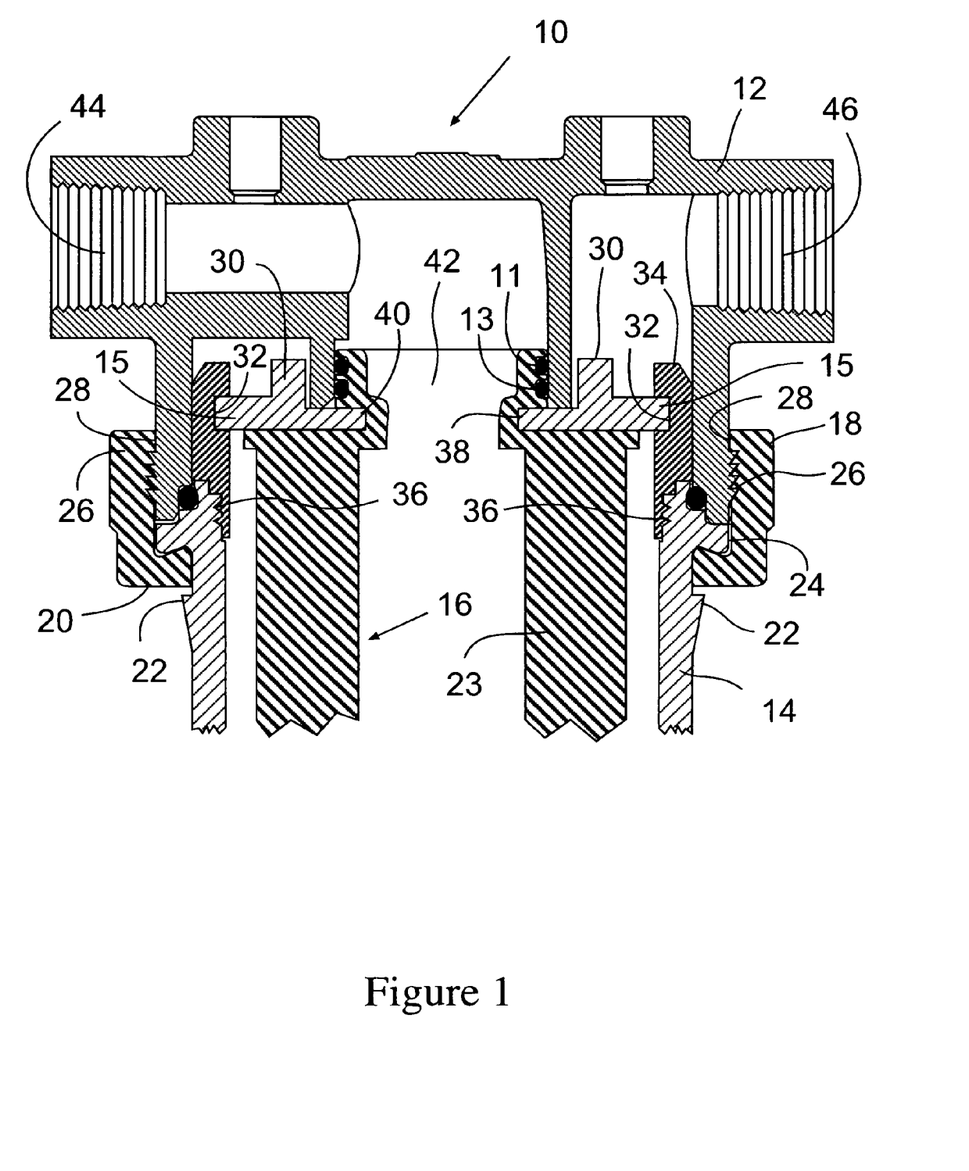
FIG. 1 is a cross sectional view of a filter module of this invention.

Referring to FIG. 1, a filtration module 10 comprises a manifold 12, a bowl 14 and a filter cartridge 16. A threaded ring 18 is positioned on the outside surface 20 of bowl 14 and is retained thereon by bead 22 which extends around the circumference of the bowl 14 and lip 24. By controlling the size and flexibility of bead 22, the ring 18 can be slipped over the bead 22 to position the ring 18 or the bead 22 can be formed on the bowl 14 after the ring 18 is positioned as shown.

The ring 18 is substantially fixed in its position relative to the bowl 14, i.e., it cannot move any substantial distance along the length of the bowl 14. When its threads 26 and 28 are drawn together, the ring 18 carries or drives the cartridge 16 into affirmative contact with manifold 12 to effect sealing with O-rings 11 and 13. Conversely, when the ring 18 is rotated so as to drive the threads 26 and 28 apart, the cartridge 16 is positively carried or driven away from the manifold 12.

The cartridge 16 is connected to bowl 14 by flanges 15 on key 30 which mate with slots 32 in collar 34. The collar 34 is threaded into bowl 14 by threads 36. The collar 34 extends about the entire inner circumference of bowl 14. Alternatively, the bowl and collar can be formed of one piece in the shape of bowl 14 and the collar 34 such as by molding. The key 30 fits onto two flat surfaces 38 and 40 positioned on the outside surface of fluid passageway 42 of cartridge 16. Fluid passageway 42 includes sealing O-rings 11 and 13 and can function as an inlet or outlet for cartridge 16. When the fluid passageway functions an an inlet, fluid is introduced into inlet 44 of manifold 12. When the fluid passageway 42 functions as an outlet, fluid is introduced through inlet 46 of manifold 12. Since flanges 15 do not extend about the entire circumference of the key 30, fluid is capable of by-passing the key 30 to flow into the manifold 12. The structure of the key 30 will be more fully described with reference to FIG. 2. The structure of the collar 34 will be more fully described with reference to FIG. 3.

Figure 2:
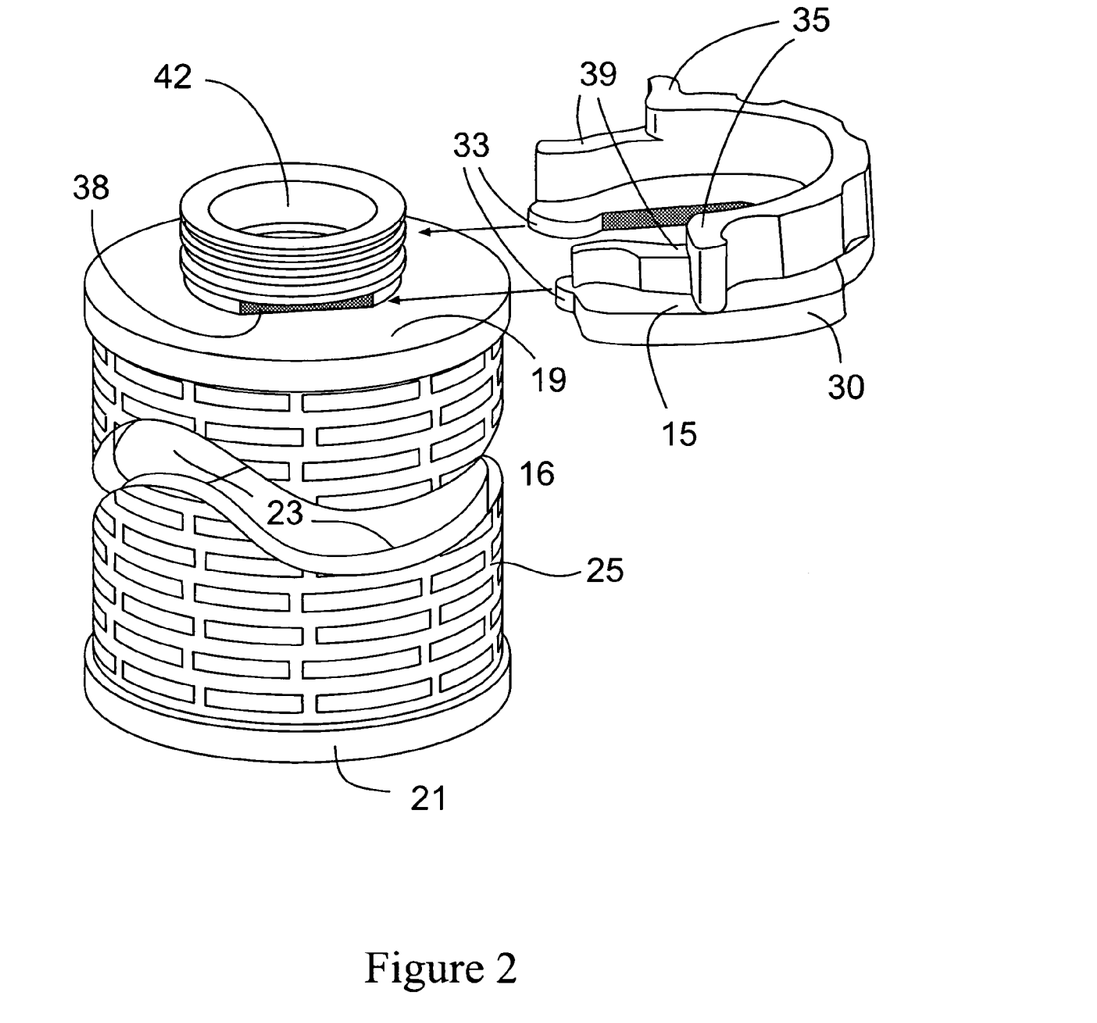
FIG. 2 is an isometric view of a cartridge top and mating key of this invention.

Referring to FIG. 2, the fluid passageway 42 of cartridge 16 is modified to form two flat surfaces 38 and 40 (not shown, see FIG. 1) positioned substantially parallel to each other. The flat surfaces 38 and 40 fit with flat surfaces 39 on key 30. The key 30 includes two flexible legs 33 which can be opened so that flat surfaces 38 and 40 mate with flat surfaces 39. By being so-shaped, the key 30 is fit around fluid passageway 42 to provide a strong connection between the key 34 and the fluid passageway 42 while avoiding significant blockage of the passageway 42. The key 30 also can include optional vertical extensions 35. The filter cartridge 16 includes a top cap 19, a bottom cap 21, a filter 23 and a porous housing 25. The caps 19 and 21 are sealed to the ends of the filter 23 to prevent admixture of fluid feed with permeate. The structure of the filter cartridge 16 assures that fluid entering the filter cartridge 16 passes through the filter 23 prior to exiting the filter cartridge 16. The filter 23 can be a depth filter, a pleated filter or the like. The optional vertical extensions 35 fit into the detents 45 shown in FIG. 3.

Figure 3:
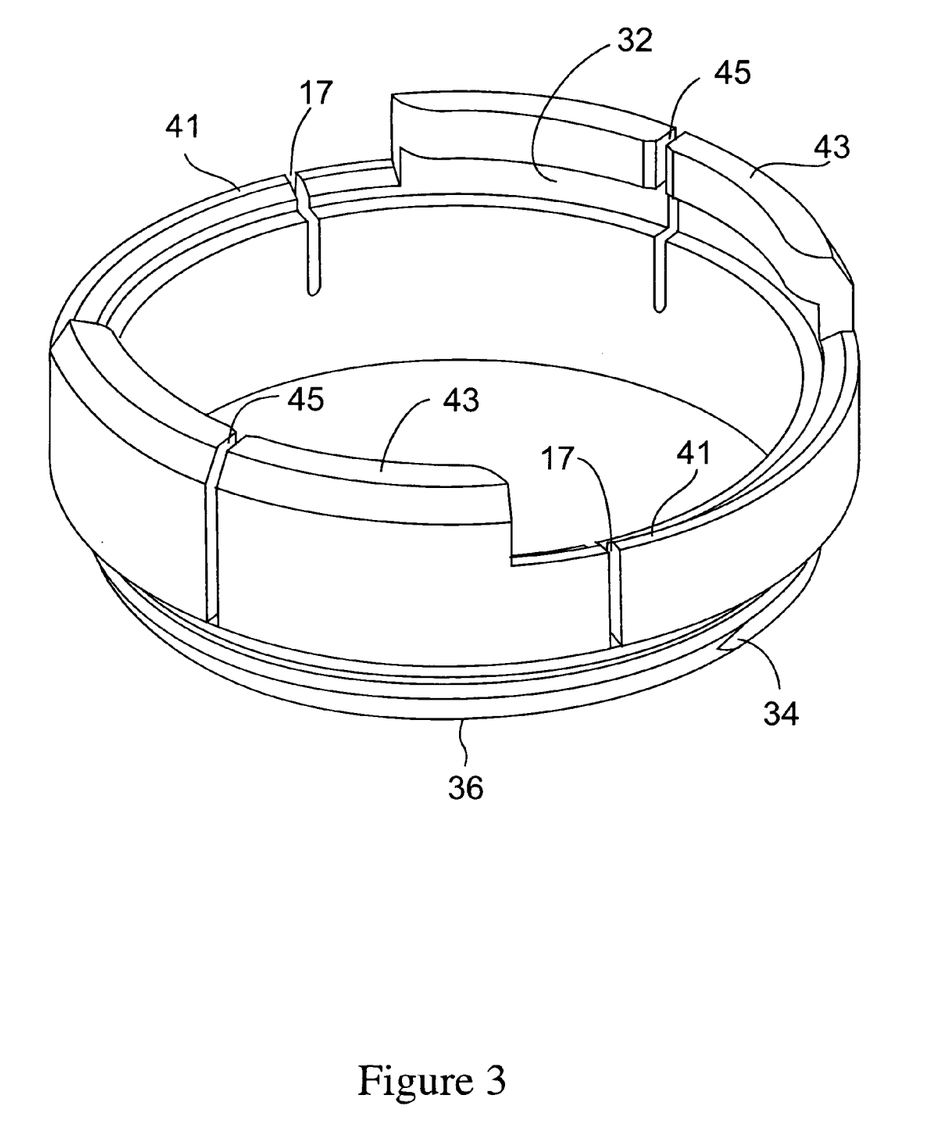
FIG. 3 is an isometric view of a collar used in conjunction with the cartridge and key of FIG. 2.

Referring to FIG. 3, the collar 34 includes two cutouts 41 and two vertical extensions 43. Each vertical extension 43 includes a slot 32 (one not shown). The slots 32 fit with and accommodate flanges 15. The angle subtended by slots 32 depend upon the flexibility of the material used to make key 30 and collar 34. The slots 32 subtend an angle of at least about 15 degrees, preferably between about 30 and about 45 degrees when the key 30 and collar 34 are made of relatively flexible polymer if perfluoro(alkylvinyl ether) (PFA). When the key 30 and collar 34 are made of relatively rigid material such as high density polypropylene, these angles can be about one-half that for PFA. This size angle with these exemplary materials provides a desired contact surface between the flanges 15 and the slots 32 so that the key 30 is not separated from the collar 34 during use of the filtration module 10. The collar 34 includes detents 45 which fit with and accommodate vertical extension 35s within collar 34. The collar 34 also includes optional vertical slots 17 which permit drainage of fluid between the collar 34 and the manifold 12.

Figure 4:
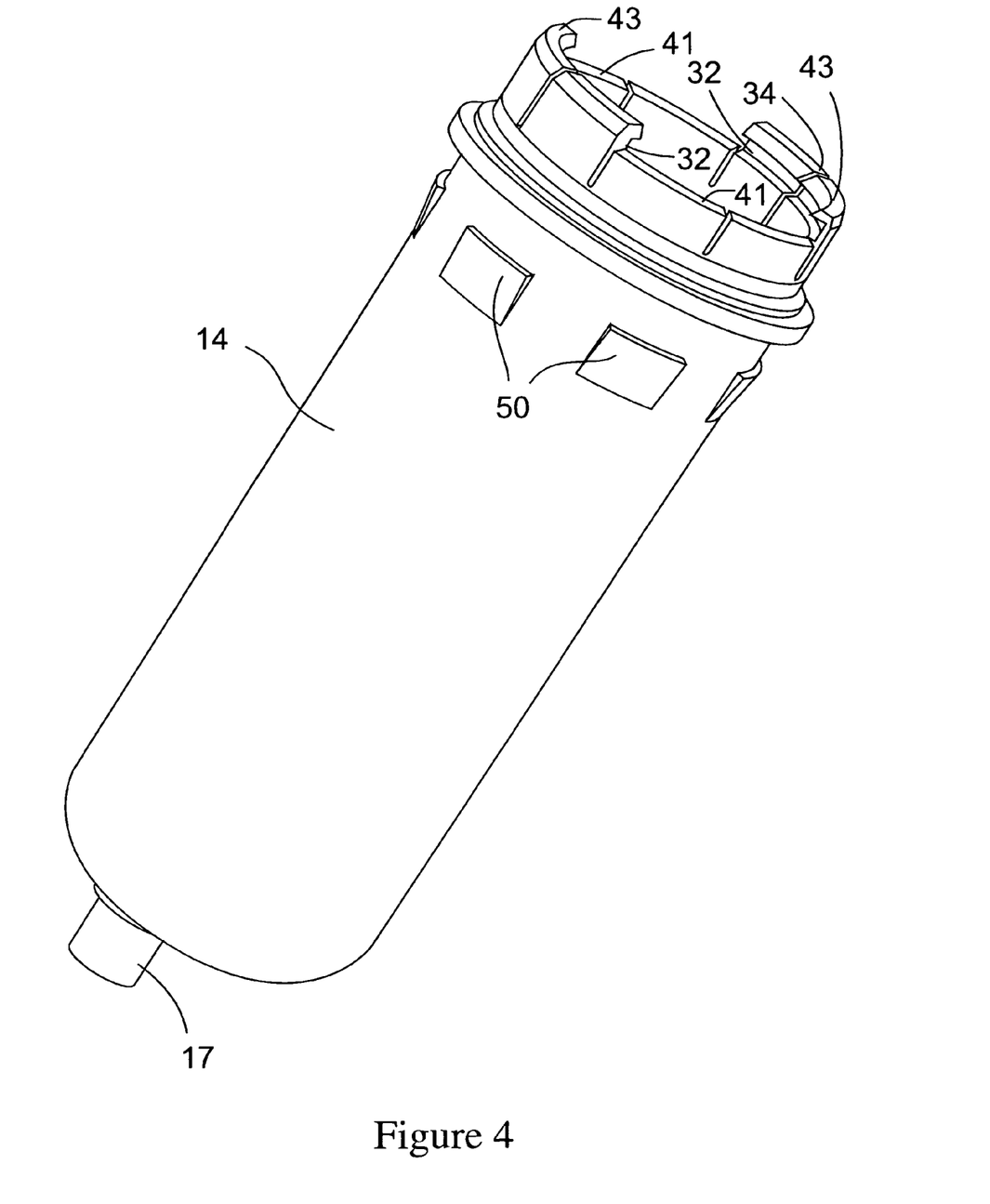
FIG. 4 is an isometric view illustrating a bowl and collar of this invention.

Referring to FIG. 4, a bowl and collar construction of this invention is shown. The collar 34 is threaded into the bowl 14. The collar and bowl 14 can be molded as one piece. The bowl 14 includes a plurality of stops 50 which support a locking ring (not shown). The bowl 14 includes a drain 17 that can be open or closed. The drain 17 is closed during filtration.

Figure 5:
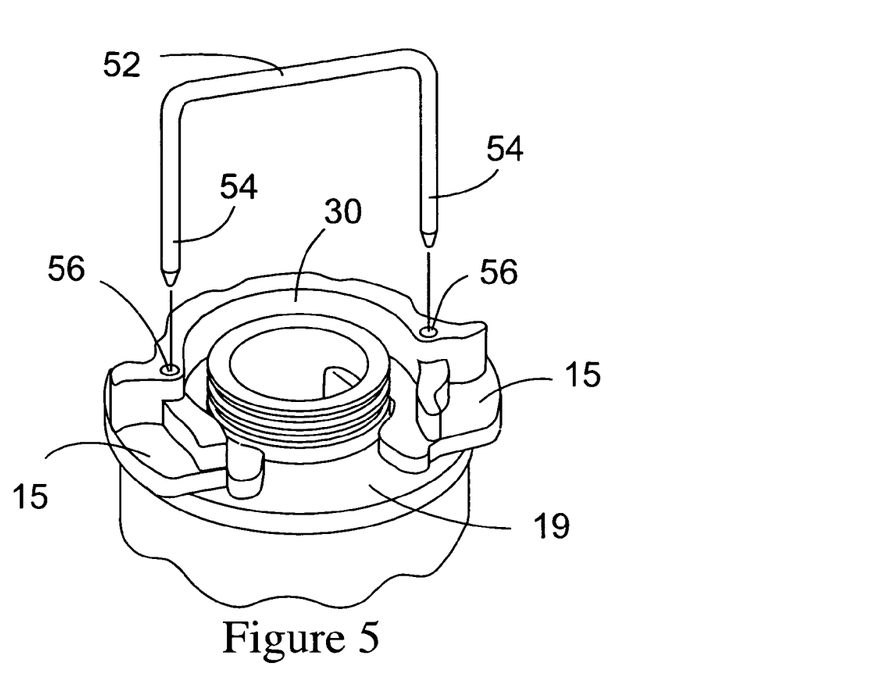
FIG. 5 is an isometric view illustrating a key and tool for installing the cartridge into a bowl.

Referring to FIG. 5, a construction is shown which permits rotation of the key 30 so that flanges 15 fit into slots 32. The pronged C shaped tool 52 has prongs 54 which fit into holes 56. The tool 52 permits avoidance of hand contact with a used cartridge 16.

Figure 6:
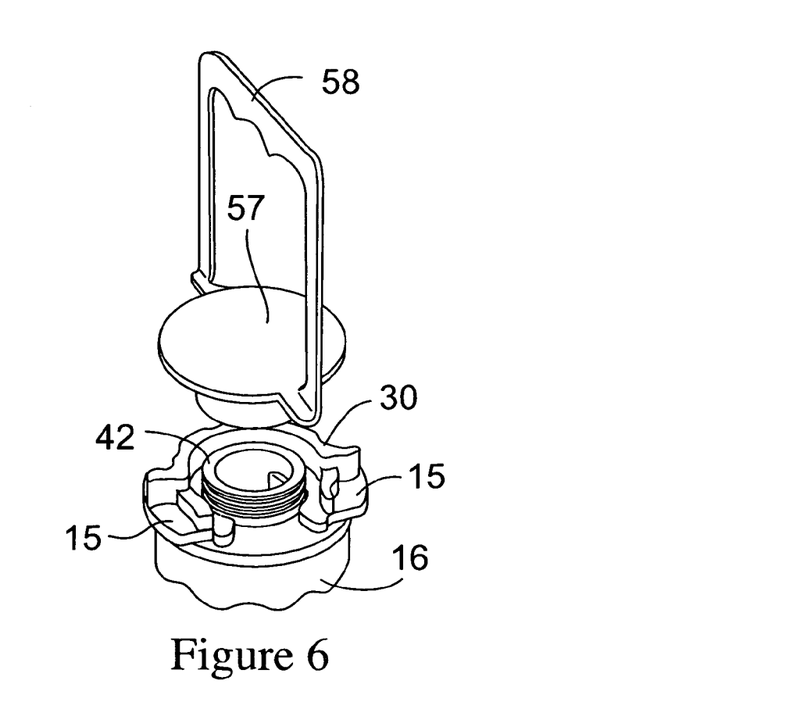
FIG. 6 is an isometric view of a means for transporting and installing a cartridge without touching the cartridge.

Referring to FIG. 6, a construction is shown which protects the interior of a filter cartridge prior to use and which permits avoidance of hand contact with the filter cartridge 16. The cap 52 fits over fluid passageway 42 to seal the interior of cartridge 16 from the atmosphere. The cap 57 is molded with a handle 58 which permits insertion and removal of the cap onto or from the fluid passageway 42. The handle 58 permits rotation of the flanges 15 into the slots 32 of collar 34 by hand. After the flanges are so-positioned, cap 57 can be removed from fluid passageway 42 by pulling on handle 58.

Figure 7:
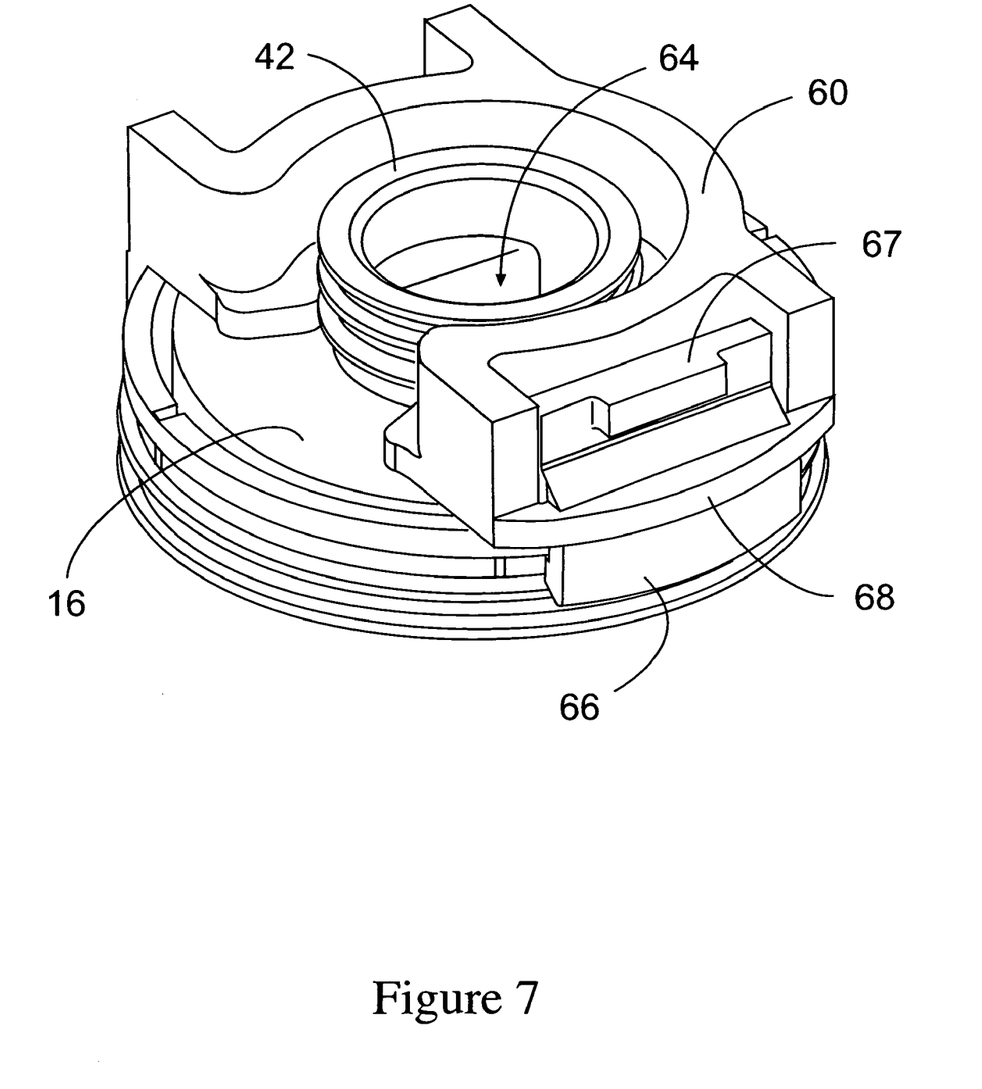
FIG. 7 is a top isometric view of an alternative key construction of this invention.
Figure 8:
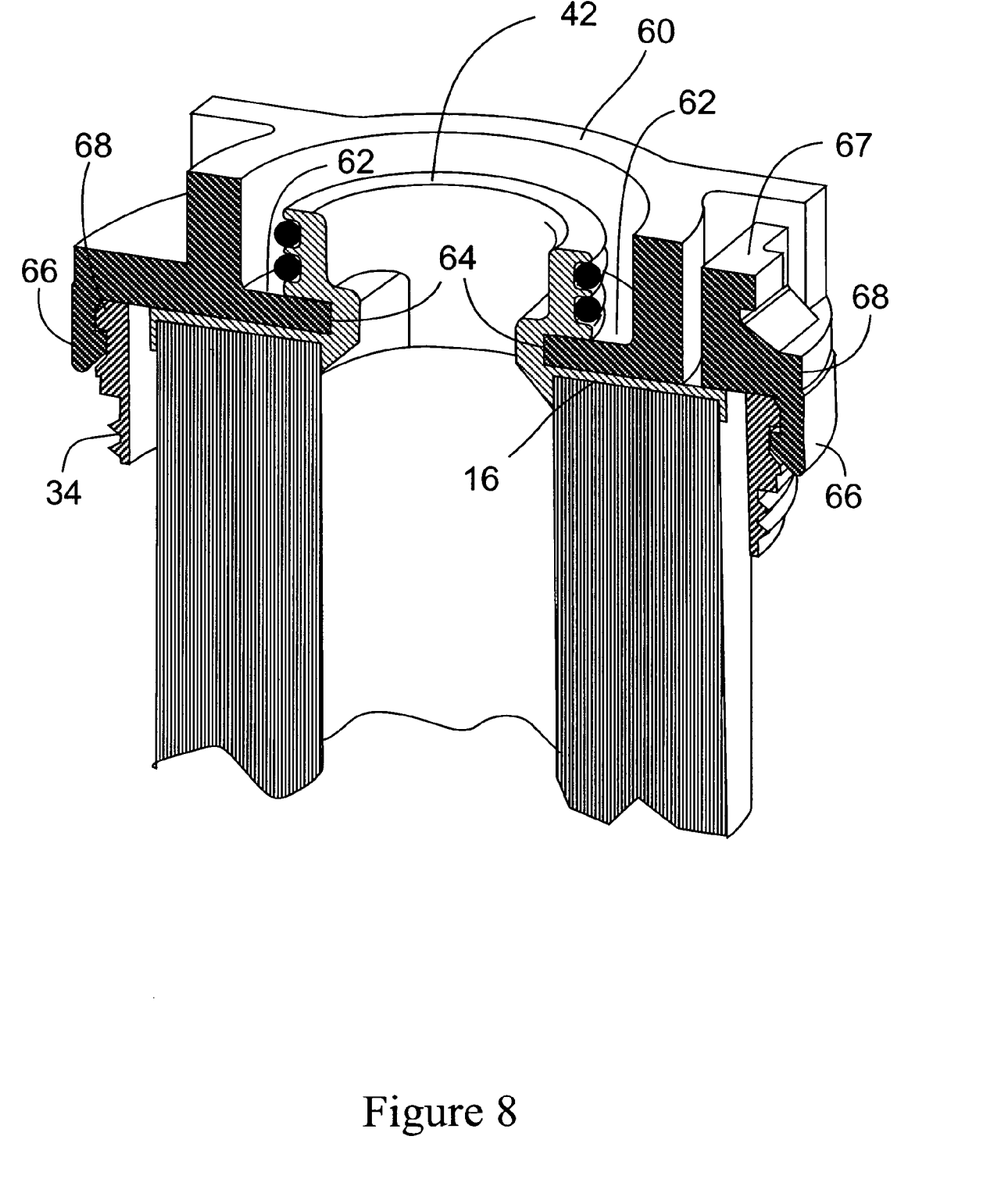
FIG. 8 is a cross sectional view of the key of FIG. 7, directly positioned on a bowl.

Referring to FIGS. 7 and 8, an alternative construction is shown for joining a filter cartridge to a bowl. The key 60 is provided with two prongs 62 which are slideably connected to fluid passageway 42 in contact with two flat surfaces 64 which are substantially parallel to each other in the same manner described above with reference to FIG. 1. As shown in FIG. 8, the hook-shaped prongs 66 fit over lip 68 of collar 34. The key 60 also is provided with levers 67 which are pivoted so that hand pressure on the levers 67 permits movement of prongs 66 into contact with or away from contact with the collar 34.

While the key of this invention has been described with reference to two opposing attachment elements (flanges or prongs), it is to be understood that the key can be provided with more than two attachment elements. At least two attachment elements are required in order to prevent the cartridge from pivoting with respect to the bowl.

Since the key of this invention is removable from the cartridge, the cartridge of this invention can be utilized with the bowl of this invention described above or with a conventionally sized bowl. The removable key permits the cartridge without the key to be inserted into a conventional bowl having no slots on its inner surface otherwise the flanges on the key would render the footprint of the overall cartridge and key to be larger than the conventional bowl diameter. This, in turn, allows for a reduction in required inventory of cartridges needed to accommodate a conventional bowl and the bowl of this invention.

In use, the levers 67 of the cartridge of FIG. 7 are subject to hand pressure thereby to move the prongs 66 away from the flat surface 64. The cartridge is dropped into the bowl, hand pressure on the levers 67 is released and the prongs 66 thereby are secured to the top lip of the bowl to secure the key 60 to the bowl.

The embodiment of FIG. 2 is inserted into the collar of FIG. 3 by aligning the flanges 15 with cutouts 41. The key 30 is then rotated so that flanges 15 fit into slots 32 thereby securing the cartridge 16 to the collar 34.

In one aspect of this invention, the key is provided with an outside surface configuration which mates with an inside surface configuration of the collar attached to the bowl in order to center the filter cartridge to which it is attached within the bowl. Centering the cartridge within the bowl allows for a smooth mating of the key and collar when the key is rotated into the collar. The outside surface configuration of the key includes a small groove. While this outside surface configuration is not required in this invention, in its absence, the key will slide from side to side within the collar thereby increasing difficulty of engaging the key and collar.

Figure 9:
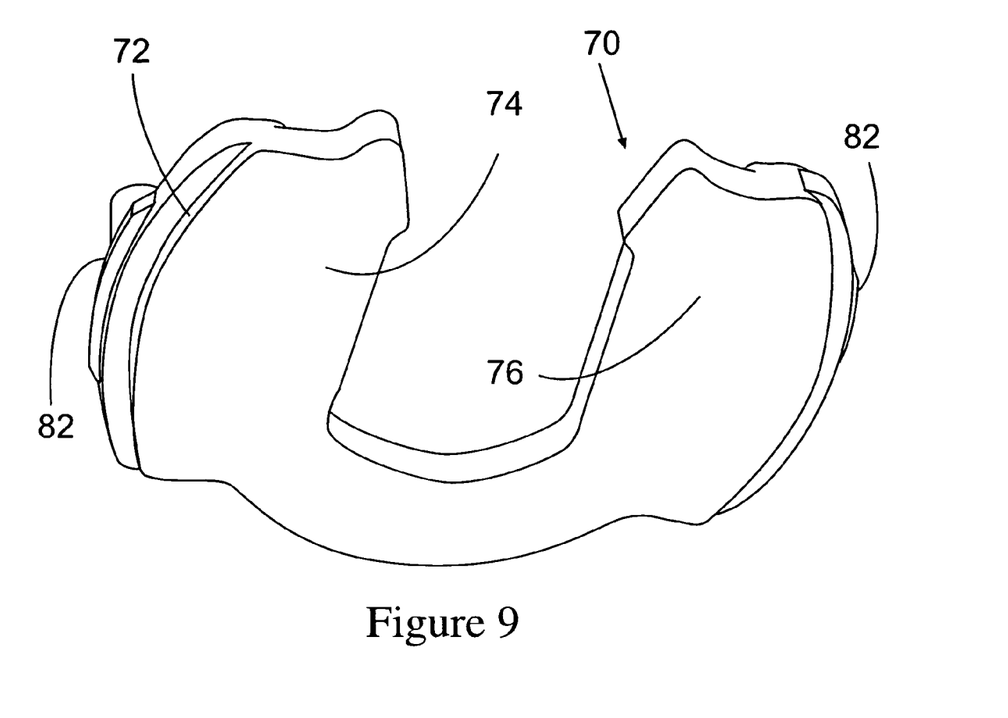
FIG. 9 is a bottom perspective view of an alternate key of this invention.
Figure 10:
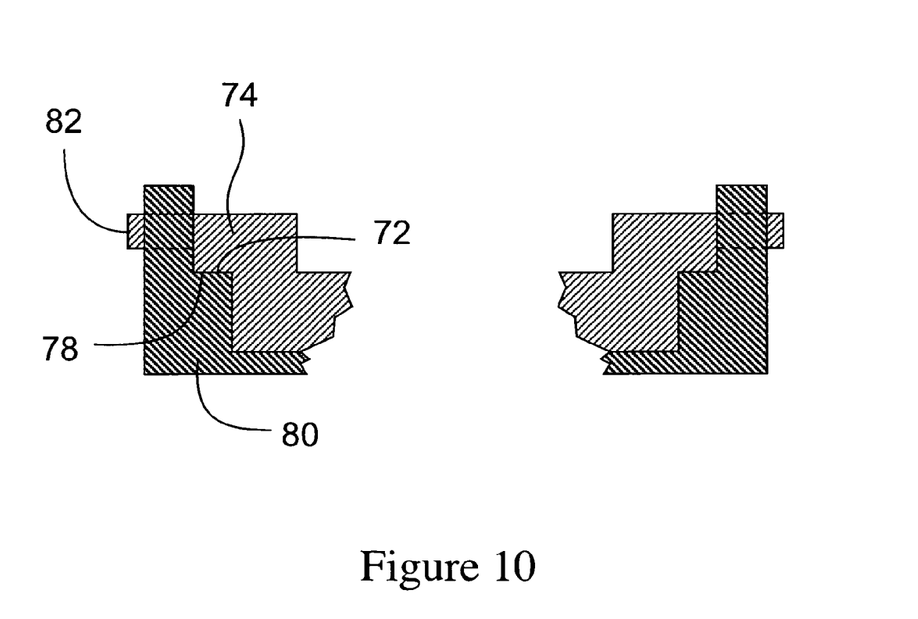
FIG. 10 is a partial cross sectional view of the position of the key of FIG. 9 on the collar shown in FIG. 11.

Referring to FIGS. 9 and 10, the key 70 includes a groove 72 on each key leg 74 and 76 which mates with a surface 78 of collar 80. While FIGS. 9 and 10 include bosses 82, they are not necessary to the groove's 72 function. The purpose of the bosses 82 are described below.

In another aspect of this invention, the collar of this invention is provided with slots which extend through the thickness of the collar. The slots mate with bosses on the key to provide an improved fit between the collar and the key. The bosses are configured to cause mating slots on the collar to expand outwardly when the key is rotated into position until the bosses fit into the open slots. At the point of fitting, the slots contract toward each other and thus overlap renders it more difficult for the key to become detached from the collar during use.

Figure 11:
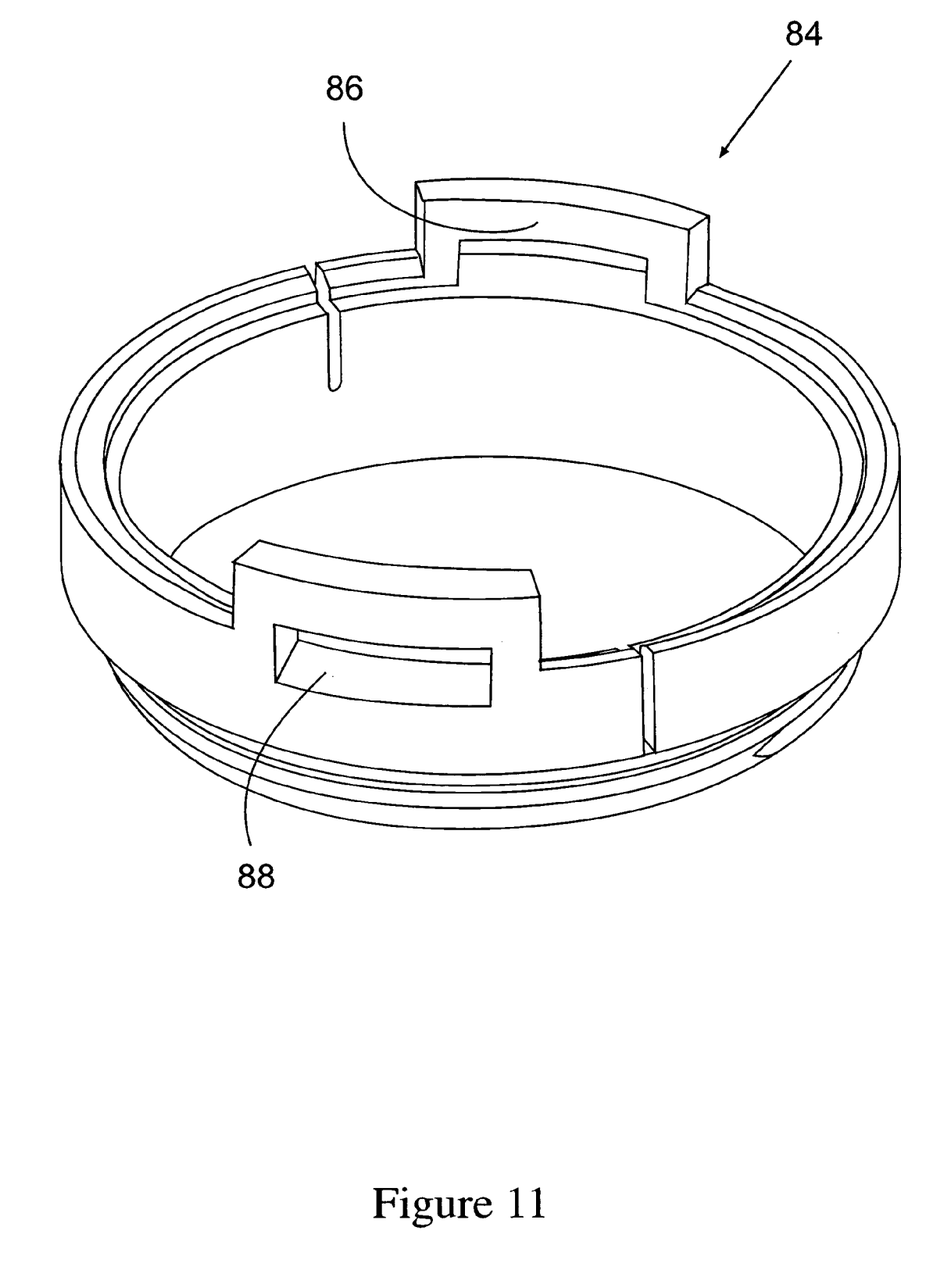
FIG. 11 is a perspective view of a collar having slots to accommodate the key of FIG. 9.
Figure 12:
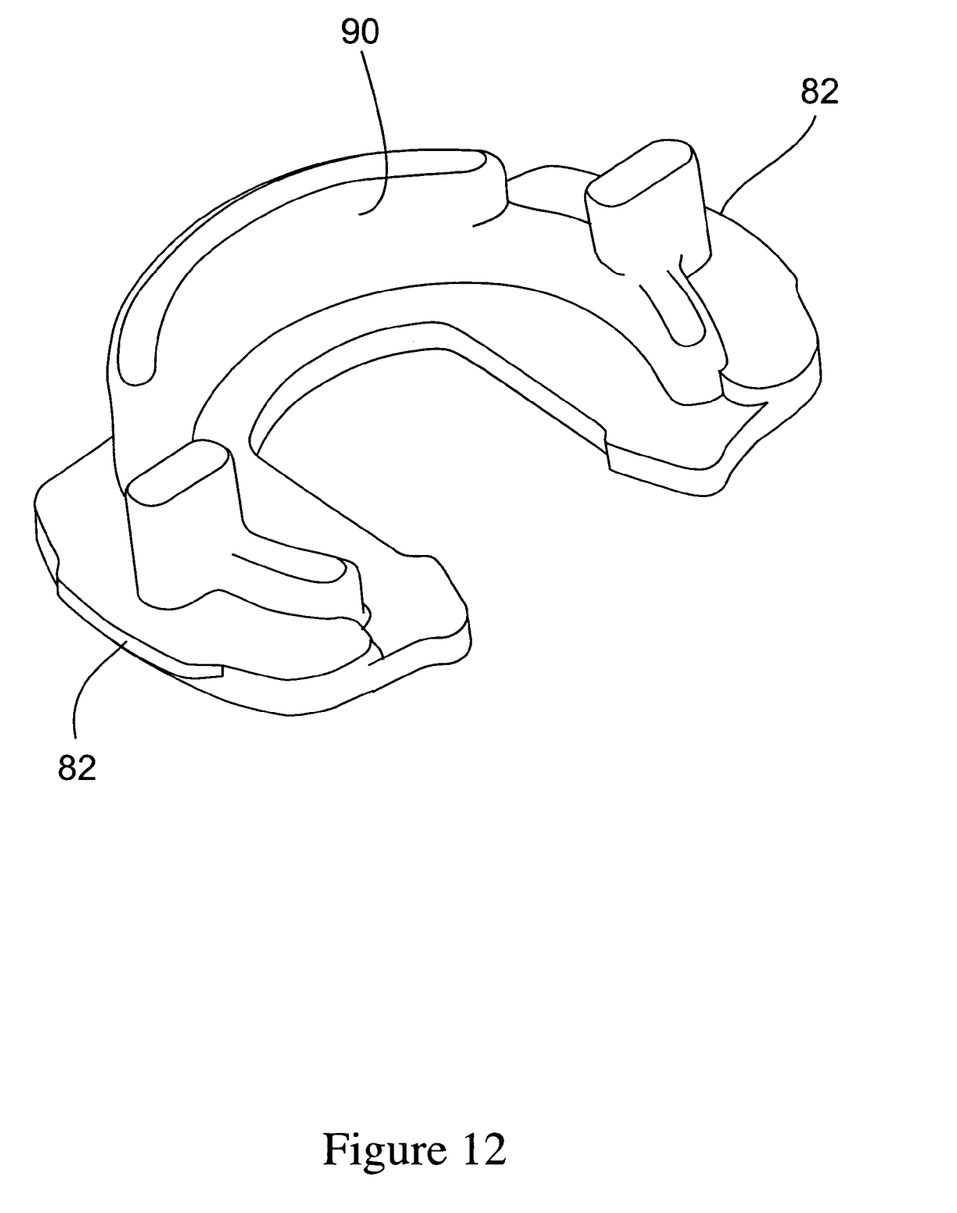
FIG. 12 is a top perspective view of an alternate key of this invention.
Figure 13:
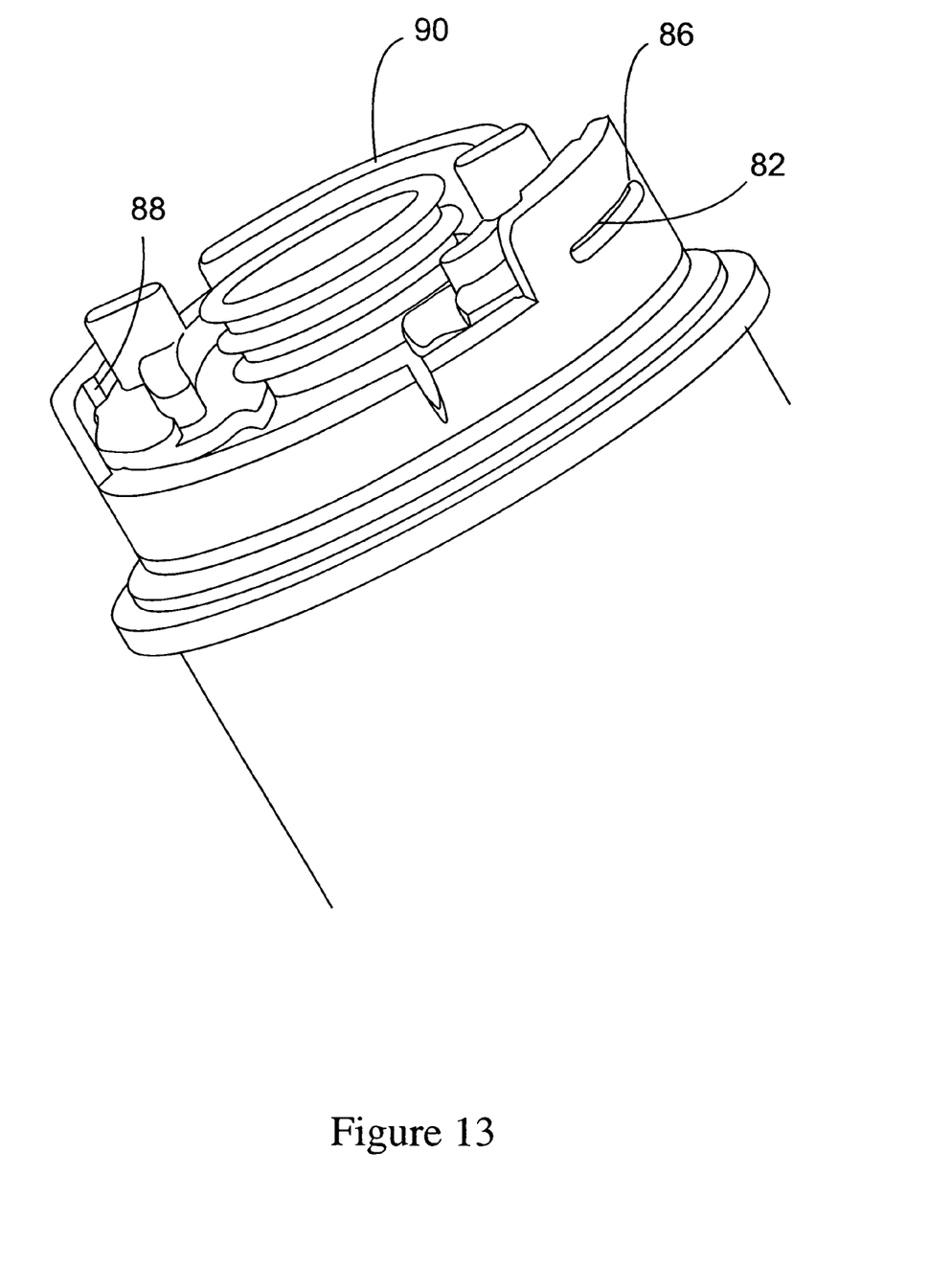
FIG. 13 is a perspective view of the key of FIG. 12 fitting with the collar of FIG. 11.

Referring to FIGS. 11, 12, and 13, the collar 84 includes two opposing slots 86 and 88 into which fit the bosses 82 when the key 90 is rotated into position into collar 84. Expansion of the slots away from each other is caused by contacting the bosses 82 with the inside surfaces of the collar 84. The distance between the outside surfaces of the bosses 82 is slightly larger than the distance between opposing inside surfaces of the collar 84.

The invention claimed is:

1. A filtration module which comprises: a manifold, a filter cartridge and a bowl which houses the filter cartridge, and means for connecting said bowl to said manifold, and a key having two first parallel inner surfaces slideably secured to two substantially second parallel surfaces on an outer surface of a wall of a fluid passageway formed with the filter cartridge, said key having at least two attachment elements attached to said bowl, so that said filter cartridge, said key, and said bowl can be detached from said manifold as one piece, said filtration cartridge and bowl being in fluid communication with said manifold in a manner that prevents mixing of a fluid feed to said filtration cartridge with a permeate removed from said filtration cartridge.

2. The filtration module of claim 1 wherein said key is attached to said bowl by prongs extending from said key which fit over a lip of a collar on said bowl.

3. The filtration module of claim 1 wherein said key is attached to said bowl by flanges extending from said key which fit into slots on a collar, said collar being directly attached to an open end of said bowl.

4. The filtration module of claim 3 wherein said bowl and said collar comprises a unitary construction.

5. The filtration module of any one of claims 1, 2, 3 and 4 which includes an inlet for fluid feed to said bowl and an outlet for permeate from said filter cartridge.

6. The filtration module of any one of claims 1, 2, 3 and 4 which includes an inlet for fluid feed to said filter cartridge and an outlet for permeate from said bowl.

7. The filtration module of any one of claims 3 or 4 wherein said key includes at least one vertical extension, each of said at least one vertical extension being fit into a vertical slot in said collar.

8. The filtration module of any one of claims 3 or 4 wherein said key includes at least two of said flanges and each of said flanges has a boss on an outside surface of each of said flanges.

9. The filtration module of any one of claims 3 or 4 wherein said key includes at least two of said flanges and each of said flanges includes a groove on a lower surface of each of said flanges, said groove shaped to mate with an inner surface of a collar attached to said bowl.

* * * * *